Aug. 14, 1945.　　　　F. PORTER　　　　2,382,944
MANUFACTURE OF PHENOLS
Filed Oct. 11, 1941
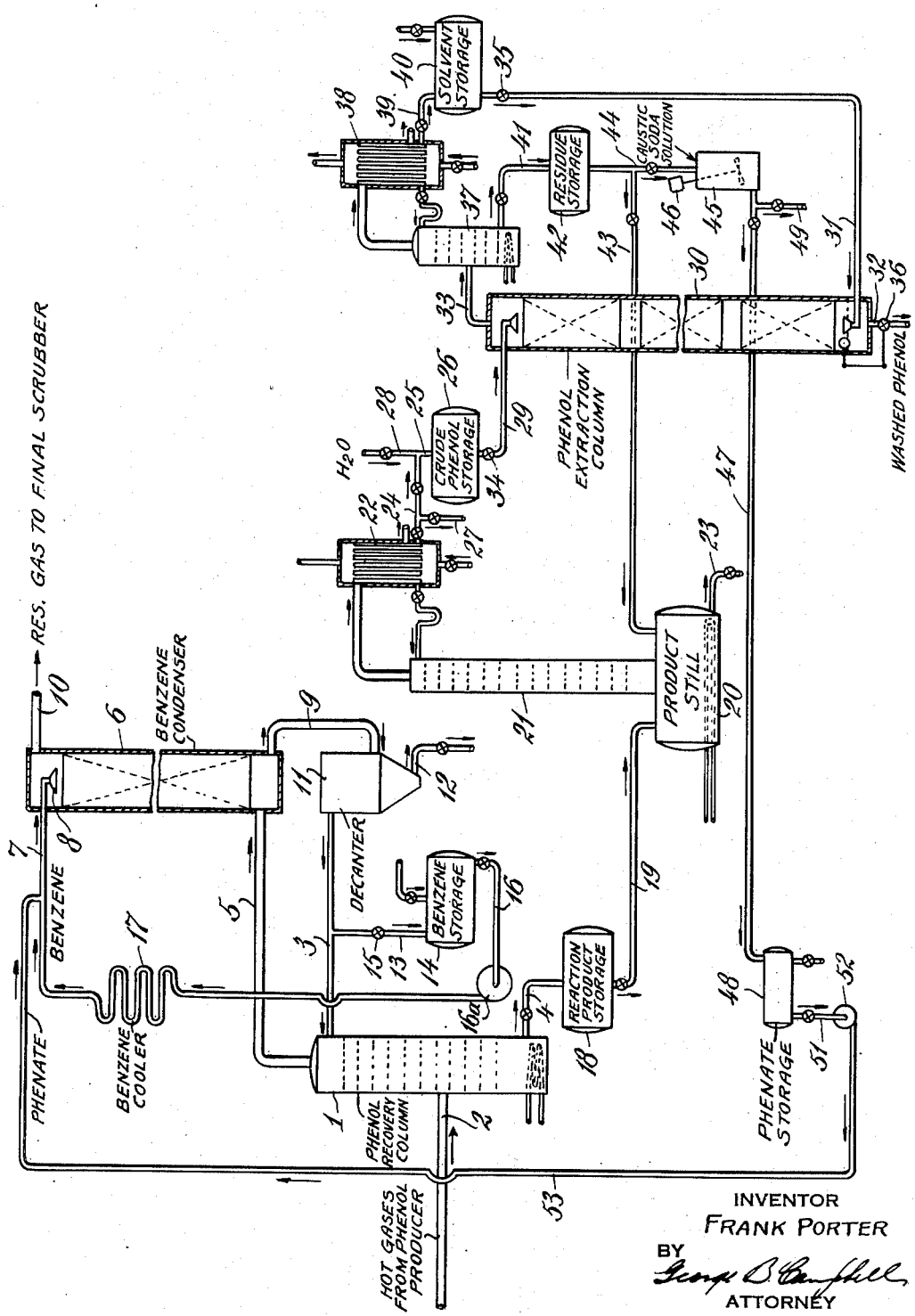
INVENTOR
FRANK PORTER
BY
George B Campbell
ATTORNEY Patented Aug. 14, 1945

2,382,944

UNITED STATES PATENT OFFICE 2,382,944

MANUFACTURE OF PHENOLS

Frank Porter, Syracuse, N. Y., assignor to The Solvay Process Company, New York, N. Y., a corporation of New York Application October 11, 1941, Serial No. 414,592

9 Claims. (Cl. 260—621)

This invention relates to the manufacture of phenols and is particularly directed to recovery of Ar-monohydroxy, mononuclear aromatic hydrocarbons of the group of phenol and cresols produced by the vapor phase oxidation of benzene and toluene, respectively, by means of molecular oxygen.

In my application Serial No. 372,062 of December 28, 1940, there is described a process for the recovery of phenol from vapor phase mixtures formed by the oxidation of benzene to phenol with molecular oxygen at elevated temperatures. The recovery process of that application involves removal of phenol from the reaction vapor mixture while maintaining the mixture above the dew point of water and out of contact with later-recovered aqueous condensate. The vapor mixture from which phenol has been removed is preferably cooled in the presence of an alkaline solution to neutralize acidic constituents such as formic acid and sulfurous acid which the mixture contains.

In my application entitled "Method of refining phenols," Serial No. 414,591, filed October 11, 1941, I have described a method for refining crude phenols, particularly phenols obtained by vapor phase oxidation of benzene or toluene, which refining method preferably involves washing the crude product containing between 80% and 98% of the phenol with a water-immiscible non-aromatic organic solvent to remove genetic impurities. The used solvent may be regenerated by fractional distillation. A small proportion of the phenol is dissolved along with impurities during the extraction and this phenol remains with impurities as a residue of the distillation. In the preferred process phenolic values are recovered from this distillation residue, at least in part, by an alkaline extraction whereby the phenol is separated as an alkali-metal phenate. As an alternative the alkaline extraction may be applied to the solvent mixture prior to removal of impurities. While this latter method has the advantage of avoiding the presence of the phenol in the solvent still, it has the disadvantage of requiring a treater with sufficient capacity to hold the solvent as well as the phenol, impurities, and alkaline solution.

In accordance with the process of the present invention I employ the alkali-metal phenate obtained by alkaline treatment of the solvent or solvent distillation residue for neutralizing the acidic constituents in the reaction gas mixture from the oxidation process, preferably the residual gas from which phenol has been removed, either before or during condensation of the excess unreacted aromatic hydrocarbon; at the same time the acidic constituents present in the reaction mixture, particularly the formic acid, neutralize the alkali-metal phenate and thus regenerate the free phenol.

It is especially advantageous to employ the alkali-metal phenate in the aromatic hydrocarbon condensation step following the phenol recovery. The phenol liberated from the aqueous phenate dissolves in the hydrocarbon condensate, which, as described in my application Serial No. 372,062, may be used as a cooling medium in the phenol recovery step and in this way may have its phenolic content recovered along with the main phenolic product. The aqueous alkali-metal phenate may be used in the aromatic hydrocarbon condenser either alone or in conjunction with additional cooling liquid. For instance, it may be used in an indirect heat exchanger serving as a hydrocarbon condenser or in a direct cooler. In the latter case if recovery of formic acid is not desired, sufficient water may be used to cool the gases and condense unreacted aromatic hydrocarbon and the resulting aqueous formate solution may be wasted. A preferred process involves a direct contact cooler using unreacted hydrocarbon initial material as the cooling liquid.

The process of the invention accordingly effects the recovery of formic acid from reaction gases in the form of alkali-metal formate and contributes to the substantially complete recovery of the phenol in the free form.

The accompanying drawing illustrates diagrammatically an arrangement of apparatus suitable for conducting the process of the invention as applied to the manufacture of phenol by the vapor phase air oxidation of benzene, for which the process is especially suitable.

In the drawing the numeral 1 designates a phenol recovery column having hot gas inlet 2 for reaction gas from the phenol reactor, liquid inlet 3 at the top and valve-controlled outlet 4 at the bottom.

From the top of column 1, gas conduit 5 leads to the bottom of benzene condenser 6, which may be of any suitable construction for bringing gas and liquid into intimate contact, for instance it may be a packed column, bubble-cap column, or cascade column. It has a liquid inlet pipe 7 provided with a distributor 8 at the top and a liquid outlet pipe 9 at the bottom. From the top of condenser 6 gas conduit 10 leads to scrubbing apparatus for removal of benzene and any other constituents of the gas, recovery of which is desirable. Outlet pipe 9 leads from condenser 6 to decanter 11. The decanter 11 has an outlet pipe 12 at the bottom for withdrawal of aqueous solution. The decanter 11 is connected at its top with pipe 3 leading to the phenol recovery column 1, and also with pipe 13 leading to a benzene storage tank 14. The distribution of flow from the decanter 11 to column 1 and tank 14 may be controlled by a valve 15. From tank 14 supply line 16 including a pump 16a leads to cooler 17 and thence to inlet pipe 7.

From the bottom of column 1, valve-controlled outlet pipe 4 leads to a product storage tank 18 which is connected by the valve-controlled pipeline 19 with a conventional still 20 having fractionating column 21, reflux and product condenser 22, and residue drain-pipe 23. Condenser 22 is connected by pipes 24 and 25 with storage tank 26 for distilled phenol. A branch outlet pipe 27 is provided for withdrawal of light distillate. An inlet 28 for water is arranged on pipe 25 for supplying water to the crude phenol storage tank 26.

Phenol storage tank 26 is connected by a valve-controlled pipe-line 29 with extraction column 30, which may be of any suitable construction and is shown as a conventional packed column. The extraction column 30 has an inlet pipe 31 at the bottom for solvent and outlet pipe 32 at the bottom for washed phenol, and an outlet pipe 33 at the top for used solvent. Flow through the extraction column is controlled by valves 34, 35, and 36 on lines 29, 31, and 32, respectively. Pipeline 33 leads to distillation column 37 having a reflux and product condenser 38. Condensate line 39 leads to storage tank 40 which supplies solvent to pipe 31. From the base of column 37 residue outlet pipe 41 leads to storage tank 42. This storage tank is connected by valve-controlled lines 43 and 44 with product still 20 and treater 45. The treater 45 is a tank equipped with suitable agitating means 46 and is connected by pipe 47 with phenate solution storage tank 48. Oil outlet 49 is provided on pipe 47. Tank 48 is connected to pipe 7 by line 51, pump 52, and line 53.

Conventional mechanical features such as insulation, jacketing, temperature control means, and flow regulating devices are to be understood as applicable though not specifically shown in the drawing. While some units of the treatment system have been shown as batch units and others as continuous units, it is obvious that the two types of apparatus are interchangeable for all units between tank 18 and tank 48.

The following example will illustrate the operation of the above described apparatus.

A gaseous reaction mixture comprising nitrogen, oxygen, carbon monoxide, water, benzene, phenol, and organic reaction by-products including diphenyl, naphthalene, styrene, indene and formic acid, enters column 1 at a temperature between 100° and 200° C. and passes up through this column countercurrent to a flow of benzene which enters through pipe 3 at a temperature around 60° C. The phenol and high-boiling by-products are thus washed from the reaction mixture and a portion of the benzene is vaporized. The residual gaseous reaction mixture at about 60° to 80° C. and containing only a very small proportion of its total initial phenol content passes through conduit 5 to benzene condenser 6 where it meets cooler benzene condensate containing a small proportion of aqueous sodium phenate solution, introduced through distributor 8 at between 10° and 40° C.

The amount of sodium phenate introduced at 8 may be on the order of 4% by weight of the phenol produced in the reaction unit. The amount of benzene introduced at 8 should be controlled to provide a low outlet temperature for the gas, for instance a final gas temperature between about 10° and about 40° C., in order to condense as much of the benzene content of the gas as reasonably possible. The amount of water in the aqueous phase is not important so long as enough is employed to provide a fluid solution. The amount of water is increased by condensation.

In the condenser 6 the hot gaseous mixture gives up its acidic constituents to the aqueous sodium-phenate solution and the latter in turn gives up to the benzene the phenol thus liberated; the benzene upon leaving the condenser may contain on the order of 0.2% by weight of phenol. Both the benzene and aqueous liquid at about 60° C. are withdrawn through line 9 to decanter 11 where the aqueous solution containing sodium formate and other neutralized acids is withdrawn through outlet 12.

Part of the benzene condensate containing phenolic constituents is cooled and recirculated to condenser 6 and part is passed to column 1 for use as cooling liquid therein.

The portion of benzene passed to column 1 is gradually enriched in phenol as it passes down through the column and benzene is vaporized until at a point in the column near the inlet gas conduit 2, the mixture may comprise about 50% benzene and the remainder phenol and by-products of the oxidation process. In the lower section of column 1 residual benzene is expelled from the mixture of reaction products and returned as vapor to the upper section and eventually to condenser 6. Reaction products pass off through outlet pipe 4 to storage tank 18.

The reaction mixture in storage tank 18 may comprise for example about one-third by-products and two-thirds phenol by weight. This mixture is led to product still 20 wherein it is fractionated to remove residual benzene (which is withdrawn via pipe 27 and may be returned to tank 14) and then to distill a phenol product. The distillation may be controlled advantageously to provide a phenol cut containing on the order of 2% to 20% by weight of impurities. This crude distilled phenol is collected in storage tank 26 where it is mixed with about one-fourth its weight of water and then is passed countercurrent to a suitable solvent preferably an aliphatic hydrocarbon solvent, such as petroleum naphtha, in column 30. This washing removes impurities and produces a washed phenol product which contains only small proportions of genetic impurities, on the order of a small fraction of 1% of water-insoluble organic material and perhaps as much as 1% of cresols. Naphtha and water and, if desired, cresols may be removed from the washed phenol by a final stripping or distillation step (not shown). The flow of naphtha or other solvent is preferably regulated at a rate providing between 1 and 3 parts by weight of solvent for each part by weight of phenol, although larger or smaller quantities may of course be employed.

The solvent, containing impurities extracted from the phenol, passes to distillation column 37 in which it is distilled off from impurities and collected in solvent storage tank 40, from which it may be returned to column 30. Impurities recovered as residue from this distillation are collected in storage tank 42. If desired, a portion thereof may be conveyed directly to product still 20 for separation of phenol. The remaining impurities recovered from still 37 are passed to treater 45 wherein they are mixed with an aqueous alkaline solution such as a 30%–40% NaOH solution in sufficient quantity to react with all of the phenol present. The aqueous solution and oil impurities are then separated by decantation and the aqueous solution is conducted to phenate storage tank 48 from which it is supplied to inlet 7 as needed to control the pH of the vapor mixture in condenser 6. The aqueous product withdrawn from decanter 11 may contain sodium phenate as well as sodium formate and other sodium salts. These materials can be recovered by suitable acidic treatment or discarded as desired. Normally it is desirable to coordinate the quantity of caustic soda used in treater 45 with the quantity of acidic constituents in the gaseous reaction products passing through condenser 6 so that the aqueous solution leaving condenser 6 is approximately neutral or just slightly acid. This insures substantially complete liberation of phenol and maintenance of non-corrosive conditions in the condenser. For any particular system a balance may be struck between the proportion of phenolic residue sent to treater 45 and the proportion of other acidic constituents to be neutralized in condenser 6 so that the amount of phenate formed in the treater is just sufficient to maintain the desired conditions. This manner of operation provides the maximum efficiency of phenol recovery for a given caustic soda requirement.

I claim:

1. In the manufacture of a phenol by vapor phase oxidation of an aromatic hydrocarbon, wherein the phenol formed is fractionally condensed from the product gases leaving uncondensed a residual acidic gaseous mixture, the improvement which comprises washing said residual gaseous mixture with aqueous alkali-metal phenate solution in sufficient amount to substantially neutralize the acidic constituents of said mixture and to convert said alkali metal phenate into phenol.

2. In the manufacture of an Ar-monohydroxy, mononuclear aromatic hydrocarbon by vapor phase oxidation of a mononuclear aromatic hydrocarbon and fractional condensation of the formed phenol from the resulting product gases leaving uncondensed a residual acidic gaseous mixture, the improvement which comprises washing said residual gaseous mixture with a cooler body of the aromatic hydrocarbon which contains an aqueous alkali-metal phenate in amount sufficient to substantially neutralize the acidic constituents of the residual gaseous mixture and to convert said alkali metal phenate into phenol.

3. In the manufacture of phenol by vapor phase oxidation of benzene and, first, fractional condensation of the formed phenol from the resulting product gases leaving uncondensed a residual acidic gaseous mixture followed by condensing unoxidized benzene by washing the residual gaseous mixture with cooler liquid benzene, the improvement which comprises washing said residual gaseous mixture with benzene which contains an aqueous alkali metal phenate in amount sufficient to substantially neutralize the acidic constituents of the residual gaseous mixture and to convert said alkali metal phenate into phenol.

4. In the manufacture of phenol by vapor phase oxidation of benzene and, first, fractional condensation of phenol from the resulting product gases by cooling said gases by direct contact with benzene at temperatures which leave uncondensed a residual acidic gaseous mixture containing benzene vapors and then condensing benzene vapors by directly contacting the residual gaseous mixture with cooler liquid benzene, the improvement which comprises cooling said residual gaseous mixture to condense the benzene in the presence of a relatively small proportion of an aqueous alkali metal phenate sufficient to substantially neutralize the acidic constituents of said residual gaseous mixture, whereby phenol is liberated from the alkali metal phenate and is dissolved in the benzene condensate, and passing the resulting benzene condensate containing phenol into contact with said product gases to cool the product gases, whereby phenol contained in the benzene condensate is recovered with the phenol fractionally condensed from the product gases.

5. In the manufacture of phenol by the vapor phase oxidation of benzene in such manner as to form product gases containing phenol and a minor proportion of formic acid as a by-product, fractional condensation of phenol from said product gases leaving uncondensed a residual acidic gaseous mixture containing said formic acid in vapor phase and recovery of an impure crude phenol from the products of said fractional condensation, and then condensing benzene by washing the residual gaseous mixture with cooler liquid benzene, that improvement which comprises intimately contacting with said crude phenol a water-immiscible, liquid hydrocarbon solvent in the presence of sufficient water to maintain the phenol liquid at the temperature at which it is contacted with the solvent, said solvent and crude phenol being contacted in amounts which form two liquid phases, one a solvent phase containing water-insoluble impurities extracted from said crude phenol and a minor portion of the phenol present in said crude phenol and the other a phenol phase containing the major portion of said phenol purified of said water-insoluble impurities, separating said solvent phase from the phenol phase, reacting at least a portion of the phenol contained in said solvent phase with an aqueous alkaline solution to form an alkali metal phenate solution and washing said residual gaseous mixture from which phenol has been fractionally condensed with the resulting aqueous alkali metal phenate solution to neutralize the acidic constituents in said residual gaseous mixture and convert phenate in said solution into phenol.

6. In the manufacture of phenol by the vapor phase oxidation of benzene in such manner as to form product gases comprising phenol, benzene, hydrocarbon by-products and a minor proportion of by-product formic acid, fractional condensation of phenol and hydrocarbon by-products from said product gases leaving uncondensed a residual acidic gaseous mixture containing said benzene and formic acid in vapor phase, and recovery of an impure crude phenol from the products of said fractional condensation, and then condensing benzene by washing the residual gaseous mixture with cooler liquid benzene, that improvement which comprises intimately contacting with said crude phenol a water-immiscible, non-aromatic organic solvent in the presence of sufficient water to maintain the phenol liquid at the temperature at which it is contacted with the solvent, said solvent and crude phenol being contacted in amounts which form two liquid phases, one a solvent phase containing water-insoluble impurities extracted from said crude phenol and a minor portion of the phenol present in said crude phenol and the other a phenol phase containing the major portion of said phenol purified of said water-insoluble impurities, separating said solvent phase from the phenol phase, reacting at least a portion of the phenol contained in said solvent phase with an aqueous alkali metal hydroxide solution to form an alkali metal phenate solution, cooling said residual gaseous mixture from which phenol has been fractionally condensed to condense benzene therefrom in the presence of said alkali metal phenate solution in amount sufficient to neutralize the acidic constituents of said residual gaseous mixture whereby alkali metal phenate in said solution is converted into phenol and the phenol is dissolved in the condensed benzene, and introducing the benzene containing phenol into direct contact with the aforesaid product gases in the aforedescribed step wherein they are subjected to fractional condensation of phenol and hydrocarbon by-products.

7. In the manufacture of phenol by the vapor phase oxidation of benzene in such manner as to form product gases comprising phenol, benzene, hydrocarbon by-products and a minor proportion of by-product formic acid, fractional condensation of phenol and hydrocarbon by-products from said product gases leaving uncondensed a residual acidic gaseous mixture containing said benzene and formic acid in vapor phase and then washing said residual gaseous mixture while still at an elevated temperature with cooler benzene to condense benzene, and recovery of an impure crude phenol from the condensate of said fractional condensation, that improvement which comprises extracting said crude phenol with a non-aromatic, liquid hydrocarbon oil in the presence of water in a weight ratio of 3 to 20 parts of phenol for every 1 part of water, said oil and crude phenol being contacted in amounts which form two liquid phases, one an oil phase containing water-insoluble impurities extracted from said crude phenol and only a minor portion of the phenol present in said crude phenol and the other a phenol phase containing the major portion of said phenol purified of said water-insoluble impurities, fractionally distilling said oil phase taking over as distillate said hydrocarbon oil leaving a residue of the distillation containing phenol and impurities extracted from said crude phenol, extracting said residue with an aqueous alkali metal hydroxide solution to form an aqueous solution of alkali metal phenate with the phenol present in said residue, and washing said residual gaseous mixture with the aforesaid cooler benzene mixed with said phenate solution in amount sufficient to substantially neutralize the acidic constituents of said residual gaseous mixture, thereby converting the alkali metal phenate of said solution into phenol.

8. In the manufacture of phenol by the vapor phase oxidation of benzene in such manner as to form product gases comprising phenol, benzene, hydrocarbon by-products and a minor proportion of by-product formic acid, fractional condensation of phenol and hydrocarbon by-products from said product gases leaving uncondensed a residual acidic gaseous mixture containing said benzene and formic acid in vapor phase and then washing said residual gaseous mixture while still at an elevated temperature with cooler benzene to condense benzene, and recovery of an impure crude phenol from the condensate of said fractional condensation, that improvement which comprises extracting said crude phenol with a low boiling aliphatic hydrocarbon oil in the presence of sufficient water to maintain the phenol liquid at the temperature at which it is contacted with said oil, said solvent and crude phenol being contacted in amounts which form two liquid phases, one a solvent phase containing water-insoluble impurities extracted from said crude phenol and a minor portion of the phenol which was present therein and the other a phenol phase containing the major portion of said phenol purified of said water-insoluble impurities, separating said solvent phase from the phenol phase, fractionally distilling said solvent phase taking over as distillate said hydrocarbon oil leaving a residue of the distillation containing phenol and impurities extracted from said crude phenol, extracting at least a portion of said residue with an aqueous alkali metal hydroxide solution to form an aqueous solution of alkali metal phenate with the phenol present in said residue, mixing the resulting aqueous alkali metal phenate solution with the aforesaid benzene in which the said residual gaseous mixture is washed, thereby neutralizing by means of said phenate acidic constituents of said residual gaseous mixture and converting the alkali metal phenate into phenol which is dissolved in said benzene and passing at least a part of the benzene containing phenol into direct contact with the aforesaid product gases in the step aforedescribed wherein phenol and hydrocarbon by-products are fractionally condensed from said product gases, whereby phenol present in the benzene is recovered together with phenol directly condensed from said product gases.

9. In the manufacture of phenol by the vapor phase oxidation of benzene forming hot product gases comprising phenol, unreacted benzene and by-products including water-insoluble oils and acidic constituents, and wherein the hot product gases are cooled in two steps, first by direct contact with liquid benzene to condense phenol accompanied by water-insoluble, oily by-products with liquid benzene being vaporized and in the second of which steps the residual gaseous mixture from the first step, containing benzene vapors and acidic constituents, is further cooled by direct contact with liquid benzene to condense benzene, said condensed phenol is distilled with recovery as distillate of a crude phenol containing oils separated from higher boiling impurities left as a residue of this distillation, and liquid benzene from said second cooling step is introduced into the first of said two steps, that improvement which comprises extracting in liquid phase said crude phenol with a water-immiscible, non-aromatic organic solvent in amount such that only a minor portion of the phenol is dissolved therein together with said oil impurities and another major portion of the phenol, purified of oil impurities, remains as a liquid phase separate from the solvent phase containing the extracted impurities, separating the solvent phase from the purified phenol phase, reacting phenol in at least a portion of said solvent phase with an aqueous alkaline solution, thereby forming an alkali metal phenate solution and a separate liquid phase containing oily impurities, separating said liquid phase containing oily impurities from the alkali metal phenate solution, introducing into direct contact with said residual gaseous mixture containing benzene vapors and acidic constituents in the aforesaid second cooling step said alkali metal phenate solution in amount sufficient to neutralize said acidic constituents and liberate phenol from said phenate, whereby the alkali metal phenate is converted into phenol by reaction with the acidic constituents of said gaseous mixture and phenol thus formed is recovered in said first step with the phenol condensed from said product gases.

FRANK PORTER.